United States Patent [19]

Dixit et al.

[11] Patent Number: 4,731,126

[45] Date of Patent: Mar. 15, 1988

[54] COMPOSITION AND METHOD FOR PURGING POLYMERIC RESIDUES

[75] Inventors: Thuan P. Dixit, Midland; David V. Dellar, Sanford, both of Mich.

[73] Assignee: The Dow Chemical Company, Midland, Mich.

[21] Appl. No.: 59,203

[22] Filed: Jun. 8, 1987

Related U.S. Application Data

[63] Continuation-in-part of Ser. No. 852,855, Apr. 16, 1986, abandoned, which is a continuation-in-part of Ser. No. 658,963, May 9, 1984, abandoned.

[51] Int. Cl.$^4$ .............................................. B28B 7/04
[52] U.S. Cl. ........................................ 134/38; 134/3; 134/19; 134/22.1; 134/22.11; 134/22.19; 134/41; 264/39; 252/DIG. 8; 252/23; 252/174; 526/74; 528/484

[58] Field of Search .................... 134/3, 22.19, 19, 38, 134/41, 22.1, 22.11, 22.19; 264/39, 169; 252/DIG. 8, 174, 23; 526/74; 528/484

[56] References Cited

U.S. PATENT DOCUMENTS

| | | | |
|---|---|---|---|
| 3,119,720 | 1/1964 | Stitte et al. | 134/22.19 |
| 3,476,599 | 11/1969 | Grover et al. | 134/4 |
| 3,669,740 | 6/1972 | Yamamoto et al. | 134/22.19 |
| 3,869,525 | 3/1975 | Miller | 134/38 |
| 4,425,288 | 1/1984 | Tieszen et al. | 264/39 |

*Primary Examiner*—Asok Pal
*Attorney, Agent, or Firm*—Douglas N. Deline; Thomas D. Zindrick

[57] ABSTRACT

Compositions comprising thermoplastic polymers having added thereto small amounts of a hydroxymethyl-substituted carboxylic acid are usefully employed to remove accumulated polymeric residues from polymer processing equipment.

6 Claims, No Drawings

COMPOSITION AND METHOD FOR PURGING POLYMERIC RESIDUES

This application is a continuation-in-part of application Ser. No. 852,855, filed Apr. 16 1986, now abandoned, which is a continuation-in-part of application Ser. No. 658,963, filed May 9, 1984, now abandoned.

BACKGROUND OF THE INVENTION

The present invention relates to polymers, more particularly, the present invention relates to a method for removing polymeric residues and polymeric degradation products from metal surfaces, particularly metal processing equipment used in the extrusion, blending or preparation of polymeric materials. In one embodiment, the present invention relates to a composition usefully employed in cleaning such equipment of the residues remaining after blending, mixing, extruding, molding or other production operations.

It is presently known that polymeric materials may stick and melt on hot metal surfaces such as are encountered in the processing thereof. When exposed to elevated temperatures, such polymeric materials may decompose particularly when in contact with certain metals. Continued accumulation of such polymer and decomposed polymer residue may impede further production. In such case, it may be necessary to discontinue operations in order that the equipment may be thoroughly cleaned and the accumulated polymeric residue removed.

Also when changing over from one grade of polymer to another or from one pigmented polymer to a different pigmented polymer, it may be desirable to thoroughly clean the processing equipment in order to avoid contamination of the second polymer.

Periodic cleaning by mechanical means such as by wire brushing or scraping not only is time consuming and unnecessarily labor intensive but can also result in unnecessary abrasion or damage to processing equipment.

Cleaning processing equipment with chemical mixtures involves the use of purge compounds. It is known in the art that such purge compounds utilize pentaerythritol. U.S. Pat. No. 2,744,841 discloses contacting surfaces having polyethylene accumulated thereon, with pentaerythritol at a temperature above the softening point of the polyethylene. Because pentaerythritol alone does not satisfactorily clean, and in fact adheres to the processing equipment, additional steps are required for thorough cleaning. See, for example, U.S. Pat. No. 3,119,720. Thus, heretofore cleaning methods employing pentaerythritol have had to balance time and economic efficiencies with cleaning efficacy.

It would be desirable to provide an improved process for cleaning equipment employed in the preparation of polymers. In addition, it would be desirable to provide an improved process for cleaning such equipment which avoids lengthy delays and lost production. It would further be desirable to provide a method for cleaning processing equipment and purging it of accumulated polymeric residues by the use of a similar polymeric material to that which is being processed.

SUMMARY OF THE INVENTION

According to the present invention there is provided a method for removing accumulations of polymeric residues comprising contacting a surface containing such residue with a mixture comprising a thermoplastic polymer and an effective amount to remove accumulated residues of hydroxymethyl-substituted carboxylic acid corresponding to the formula $$C_m R_{2m+2}$$

wherein R independently each occurrence is hydrogen, —COOH, —CH$_2$OH, or an inert substituent provided that R in at least one occurrence is —CH$_2$OH, and in at least one occurrence is —COOH, and m is an integer from one to about 30, said method being carried out in the absence of pentaerythritol.

DETAILED DESCRIPTION

The presently invented purging compound may be employed in a large variety of thermoplastic polymers. Examples include polymers of ethylenically unsaturated aromatic compounds, such as polystyrene, poly-alpha-methylstyrene, polyvinyltoluene, etc.; copolymers and graft copolymers of such ethylenically unsaturated aromatic compounds with elastomeric materials such as polybutadiene or olefin/diene copolymers; copolymers or terpolymers of ethylenically unsaturated aromatics and other ethylenically-unsubstituted monomers such as copolymers or terpolymers of styrene, acrylonitrile, and/or ethylenically-unsaturated carboxy containing monomers; homopolymers and copolymers of olefins, such as polyethylene, polypropylene, and copolymers of ethylene and unsaturated comonomers such as acrylic acid, vinyl acetates or alpha-olefins. Additional suitable thermoplastic polymers include polyesters such as polyethylene terephthalate and copolymers of one or more dibasic carboxylic acids and a glycol, polyamides such as nylon, polycarbonates, polyacrylics or polymethacrylics, polyvinyl ethers, polyvinyl halides, polymers and copolymers of vinylidene chloride such as saran resins, polyacetals, polyphenylenes including polyphenylene oxides or blends of polyphenylene oxides with additional polymers or copolymers.

The purge compounds employed in the present invention are carboxylic acids containing at least one primary hydroxyl group and optionally containing other inert, i.e., non-interfering substituents. The compounds may have more than one primary hydroxyl group if desired. Examples of inert substituents include nonprimary hydroxyl groups, alkyl, aryl, halogen, haloalkyl, etc. Preferred compounds are those compounds having a relatively low volatility at the process conditions employed in the purging process, i.e., compounds meeting the above formula having normal boiling point above about 150° C. Generally, purging compounds which are suitable for this invention have hydroxymethyl substituted carboxylic acid corresponding to the formula $C_m R_{2m+2}$. R independently in each occurrence is hydrogen, —COOH, —CH$_2$OH, or an inert substituent. However, R independently each occurrence is hydrogen, —COOH, —CH$_2$OH, or an inert substituent, provided that R in at least one occurrence is —CH$_2$OH and in at least one occurrence is —COOH, but is not —CH$_2$OH and —COOH in more than three occurrences for every two polymer chain backbone carbons, and m is an integer from one to about 30, said method being carried out in the absence of pentaerythritol.

The number and location of —CH$_2$OH and —COOH functions on the polymer selected will generally be apparent to one of ordinary skill in the art. Generally, there will be no more than five —CH$_2$OH functions and five —COOH functions per polymer molecule. Preferably, the purging compound should have in at least one occurrence a —COOH function on a terminal carbon of the polymer chain. Although not intended to be bound by theory, it is believed that too many —CH$_2$OH and —COOH functions exert a steric shielding effect. More than about three —CH$_2$OH and —COOH functions for every two polymer chain backbone carbons are generally too bulky to permit efficient reactivity of the purging compounds.

Exemplary purging compounds include 2-hydroxymethyl-6-methyl octanoic acid, 2-hydroxymethyl-3-phenyl propanoic acid, 2-methyl 2-hydroxymethyl malonic acid, 2,2,5,5-tetrakis(hydroxymethyl)adipic acid, 2,2-bis-hydroxymethyl)propionic acid, 4,4-bis(hydroxymethyl)pentanoic acid, 4-hydroxymethyl pentanoic acid, 2-hydroxymethyl-6-methyl octanoic acid, 12-hydroxy dodecanoic acid, 20-hydroxy eicosanoic acid, 2,2-bis(hydroxymethyl)docosanoic acid, 2-methyl, 4-4-bis(hydroxymethyl)triacontanoic acid. Particularly, preferred purging compounds include 2,2-bis(hydroxymethyl)propionic acid, and 4,4-bis(hydroxymethyl)-pentanoic acid.

The purge compounds of the present invention are readily commercially available or may be prepared according to known techniques. The purge compound may be blended or mixed in the thermoplastic polymer in order to prepare the purging composition of the present invention by known techniques, such as by milling, melt blending, or addition to an extrusion of the polymeric melt. In addition, the purge compound may be dry blended, coprecipitated or incorporated by other techniques into the thermoplastic polymer. A preferred method is to merely physically disperse the desired amount of purge compound in a volume of particulated thermoplastic polymer. The particulated thermoplastic polymer may be in the form of pellets, powder or a combination thereof. The purge compounds are added in an amount of from about 0.5 percent to about 20 percent by weight, preferably, from about 1 percent to about 15 percent by weight, and most preferably from about 2 percent to about 10 percent by weight.

In practice, the purging composition may be introduced into the equipment requiring cleaning by any suitable technique. The purging composition may additionally be diluted or blended with other polymers including polymers contained in the processing equipment at the time the cleaning or purging process is commenced. The purging composition may be extruded, blended or otherwise worked by the processing equipment in the same manner and under substantially the same processing conditions as are normally encountered. Suitably the purging composition may be employed in the cleaning and polishing of processing equipment constructed of metal or other materials such as ceramic. Especially suitably the composition may be employed with equipment constructed of steel, nickel, chrome and stainless steel, such as stainless 304 or stainless 316. The purging composition is worked through the process equipment at normal operating conditions. Preferred temperatures are from about 150° to about 250° C. Most preferred operating temperatures are from about 180° to about 230° C.

Enough of the purging composition is employed to effectively remove the desired degree of accumulated polymeric residue. If desired, the purging composition may be reused and recycled until the equipment has reached a desired state of cleanliness. If multiple extrusions are required, preferably only a single mixture, the purging composition, is utilized. After purging of polymeric residue and removal of the present purging composition, the process equipment is again ready for production.

Surprisingly, this invention is carried out without a tetrahydric alcohol, e.g., pentaerythritol, being extruded through the equipment in either a separate mixture or as a component of the purging composition.

Additional components may be employed in the purging compositions of the present invention, such as pigments, lubricants, colorants, abrasives, blending aids, antioxidants, and other conventional additives.

SPECIFIC EMBODIMENTS

Having described the invention, the following examples are provided as further illustrative of the present invention and are not be construed as limiting.

EXAMPLE 1

A Brabender mixer containing 50 grams of Styron ® 6075 flame retardant polystyrene is mixed at 190° C. and 50 rpm for 15 minutes. The mixing blades acquire a thick coating of melted polymer and degraded polymer. An additional sample (50 grams) of a mixture of powdered and pelletized Styron ® 685D polystyrene containing 5 weight percent 2,2-bis(hydroxymethyl)propionic acid is added and the mixer again activated to blend the mixture at 190° C. at 50 rpm for an additional 10 minutes. The mixture is then removed and discarded from the blender. Accumulated polymer and polymer residue is effectively removed from the blades and walls of the mixer.

EXAMPLE 2

The experimental conditions employed in Example 1 are substantially repeated employing Styron ® 685D polystyrene containing 2 weight percent 2,2-bis(hydroxymethyl)propionic acid. After mixing at 190° C. and 50 rpm for 15 minutes, all polymeric residue is removed from the mixer blade and walls.

EXAMPLE 3

The reaction condition of Example 1 are substantially repeated employing Styron ® 685D polystyrene having added thereto about 10 weight percent 2,2-bis(hydroxymethyl)propionic acid. After mixing at 190° C. at 50 rpm for about 10 minutes, the blender is substantially clean.

EXAMPLE 4

The experimental conditions of Example 1 are again repeated employing low density polyethylene having a density of about 0.93 g/cc. After mixing of about 50 grams of low density polyethylene at 190° C. for about 15 minutes, the mixer blades and walls are coated with accumulated polymeric residue. A mixture of low density polyethylene containing 2 weight percent 2,2-bis(hydroxymethyl)propionic acid is added and blended at 190° C. at 50 rpm for 10 minutes. All polymeric residue is removed from the mixer blades and walls.

EXAMPLE 5

The experimental conditions of Example 4 are again repeated employing low density polyethylene having added thereto about 10 weight percent 2,2-bis(hydroxymethyl)propionic acid. After blending at 190° C. at 50 rpm for about 10 minutes, all accumulated polymeric residue is removed from the blender blades and walls.

EXAMPLE 6

The experimental conditions of Example 1 are again repeated employing as a purging composition Styron ® 685D polystyrene having added thereto about 5 weight percent 4,4-bis(hydroxymethyl)pentanoic acid. After mixing for about 10 minutes at 190° C. at 50 rpm, substantially all accumulated polymeric residue is removed from the mixer blades and walls.

EXAMPLES 7–41

The experimental conditions of Example 1 are substantially repeated employing 5 percent by weight 2,2-bis(hydroxymethyl)propionic acid in a variety of thermoplastic resins to remove accumulated residue of various polymers and articles of equipment including a Bradender mixer, a Haake mixer, a Haake extruder, a Brabender extruder, a WP extruder, a Davis-Standard extrude with slit die and an injection molding machine. Resins tested are listed in Table I. In all cases, satisfactory cleaning and removal of accumulated polymeric residue is observed.

TABLE I

| Example | Removed Resin | Purging Composition Base Resin |
|---|---|---|
| 7 | Styron 685D PS[1] | FRPS 6075[2] |
| 8 | " | Styron 685D PS |
| 9 | " | HDPE[3] |
| 10 | " | LLDPE[4] |
| 11 | Styron 685D PS[1] + carbon black | Styron 685D PS |
| 12 | HDPE | Styron 685D PS |
| 13 | HDPE | HDPE |
| 14 | HDPE | LLDPE |
| 15 | LDPE[5] | Styron 685D PS |
| 16 | LDPE | Styron 685D PS |
| 17 | LDPE | LLDPE |
| 18 | LDPE + carbon black | HDPE |
| 19 | LLDPE | Styron 685D PS |
| 20 | LLDPE | HDPE |
| 21 | LLDPE | LLDPE |
| 22 | SAN[6] | Styron 685D PS |
| 23 | SAN | HDPE |
| 24 | SAN | LLDPE |
| 25 | SAN | LDPE |
| 26 | ABS[7] | Styron 685D PS |
| 27 | ABS | HDPE |
| 28 | ABS | LLDPE |
| 29 | ABS | LLDPE |
| 30 | ABS + carbon black | Styron 685D PS |
| 31 | Polycarbonate[8] | Styron 685D PS |
| 32 | Polycarbonate | HDPE |
| 33 | Polycarbonate | LLDPE |
| 34 | Nylon[9] | Styron 685D PS |
| 35 | Nylon | Styron 685D PS |
| 36 | Nylon | LLDPE |
| 37 | Polyether - block amide[10] | Styron 685D PS |
| 38 | Polyether - block amide | HDPE |
| 39 | Polyether - block amide | LLDPE |
| 40 | Saran B2000[11] | HDPE |
| 41 | Saran B2000 | LLDPE |

[1]General purpose polystyrene available from The Dow Chemical Company.
[2]Polystyrene with flame retardant properties available commercially from The Dow Chemical Company.
[3]High density polyethylene.
[4]Linear low density polyethylene.
[5]Low density polyethylene.
[6]Styrene acrylonitrile copolymer.
[7]Acrylonitrile butadiene styrene copolymer.
[8]A general purpose polycarbonate designated XP 73009, available from The Dow Chemical Company.
[9]Zytel FE 2346N, available from duPont.
[10]Rilsan PEBAX.
[11]Available from The Dow Chemical Company.

EXAMPLE 42

The experimental conditions of Example 1 are substantially repeated with the following exception. 2-Hydroxy-methyl-6-methyl octanoic acid is substituted for the 2,2-bis-hydroxymethyl)propionic acid.

The removal of polymeric residue from the mixer blade and walls is substantially similar to the results achieved in Example 1.

EXAMPLES 43

The experimental conditions of Example 1 are substantially repeated with the following exception. 2-Hydroxymethyl-3-phenyl propanoic acid is substituted for the 2,2-bis-hydroxymethyl)propionic acid.

The removal of polymeric residue from the mixer blade and walls is substantially similar to the results achieved in Example 1.

EXAMPLES 44

The experimental conditions of Example 1 are substantially repeated with the following exception. 2-Methyl 2-hydroxymethyl malonoic acid is substituted for the 2,2-bis-hydroxymethyl)propionic acid.

The removal of polymeric residue from the mixer blade and walls is substantially similar to the results achieved in Example 1.

EXAMPLES 45

The experimental conditions of Example 1 are substantially repeated with the following exception. 2,2,5,5-Tetrakis(hydroxymethyl)adipic acid is substituted for the 2,2-bis-hydroxymethyl)propionic acid.

The removal of polymeric residue from the mixer blade and walls is substantially similar to the results achieved in Example 1.

EXAMPLES 46

The experimental conditions of Example 1 are substantially repeated with the following exception. 4-Hydroxymethyl pentanoic acid is substituted for the 2,2-bis-hydroxymethyl)propionic acid.

The removal of polymeric residue from the mixer blade and walls is substantially similar to the results achieved in Example 1.

EXAMPLES 47

The experimental conditions of Example 1 are substantially repeated with the following exception. 2-Hydroxymethyl-6-methyl octanoic acid is substituted for the 2,2-bis-hydroxymethyl)propionic acid.

The removal of polymeric residue from the mixer blade and walls is substantially similar to the results achieved in Example 1.

EXAMPLES 48

The experimental conditions of Example 1 are substantially repeated with the following exception. 12-Hydroxy dodecanoic acid is substituted for the 2,2-bis-hydroxymethyl)propionic acid.

The removal of polymeric residue from the mixer blade and walls is substantially similar to the results achieved in Example 1.

EXAMPLES 29

The experimental conditions of Example 1 are substantially repeated with the following exception. 20-Hydroxy eicosanoic acid is substituted for the 2,2-bis-hydroxymethyl)propionic acid.

The removal of polymeric residue from the mixer blade and walls is substantially similar to the results achieved in Example 1.

EXAMPLES 50

The experimental conditions of Example 1 are substantially repeated with the following exception. 2,2-Bis(hydroxymethyl)docosanoic acid is substituted for the 2,2-bis-hydroxymethyl)propionic acid.

The removal of polymeric residue from the mixer blade and walls is substantially similar to the results achieved in Example 1.

EXAMPLES 51

The experimental conditions of Example 1 are substantially repeated with the following exception. 2,2-Bis(hydroxymethyl)docosanoic acid is substituted for the 2,2-bis-hydroxymethyl)propionic acid.

The removal of polymeric residue from the mixer blade and walls is substantially similar to the results achieved in Example 1.

EXAMPLES 52

The experimental conditions of Example 1 are substantially repeated with the following exception. 2-methyl, 4-4-bis(hydroxymethyl)triacontanoic acid is substituted for the 2,2-bis-hydroxymethyl)propionic acid.

The removal of polymeric residue from the mixer blade and walls is substantially similar to the results achieved in Example 1.

What is claimed is:

1. A method for removing accumulated polymeric residue from polymer processing equipment which comprises as the essential cleaning step contacting such equipment with a mixture comprising a thermoplastic polymer and an effective amount to remove accumulated residues of a hydroxymethyl substituted carboxylic acid corresponding to the formula:

$$C_m R_{2m+2}$$

wherein R independently each occurrence is hydrogen, —COOH, —CH$_2$OH, or an inert substituent, provided that R in at least one occurrence each is —CH$_2$OH and —COOH but in not more than three occurrences for every two polymer chain backbone carbons, and m is an integer from one to about 30, said method being carried out in the absence of pentaerythritol.

2. A method according to claim 1 wherein the hydroxymethyl-substituted carboxylic acid is present in an amount from about 0.5 percent to about 20 percent by weight of the mixture.

3. A method according to claim 2 wherein the hydroxymethyl-substituted carboxylic acid is present in an amount from about 1 percent to about 15 percent.

4. A method according to claim 3 wherein the hydroxymethyl-substituted carboxylic acid is present in an amount from about 2 percent to about 10 percent by weight.

5. A method according to claim 1 wherein the hydroxylmethyl-substituted carboxylic acid is selected from the group consisting of 2,2-hydroxymethyl)propionic acid, 4,4-bis-(hydroxymethyl)pentanoic acid, 2-hydroxymethyl-6-methyl octanoic acid, 2-hydroxymethyl-3-phenyl propanoic acid, 2-methyl 2-hydroxymethyl malonoic acid, 2,2,5,5-tetrakis(hydroxymethyl)adipic acid, 4-hydroxymethyl pentanoic acid, 12-hydroxy dodecanoic acid, 20-hydroxy eicosanoic acid, 2,2-bis(hydroxymethyl)docosanoic acid, and 2-methyl, 4-4-bis(hydroxymethyl)triacontanoic acid.

6. The method of claim 1 wherein the purging compound has in at least one occurrence a —COOH function on a terminal carbon of the polymer chain.

* * * * *